United States Patent [19]  [11] 3,887,481
Korpics  [45] June 3, 1975

[54] BENZOTRIAZOLE AND TOLYLTRIAZOLE MIXTURE WITH TETRACHLOROETHYLENE

[75] Inventor: Charles J. Korpics, Toledo, Ohio

[73] Assignee: The Sherwin-Williams Company, Cleveland, Ohio

[22] Filed: Mar. 9, 1973

[21] Appl. No.: 339,527

Related U.S. Application Data

[63] Continuation of Ser. No. 152,528, June 14, 1971, Pat. No. 3,803,049.

[52] U.S. Cl. ............ 252/172; 21/2.7 R; 252/8.55 E; 252/153; 252/171; 252/180; 252/390; 252/394
[51] Int. Cl. ....... C11d 7/50; C23f 11/14; C23g 5/02
[58] Field of Search ............ 252/153, 390, 394, 180, 252/8.55 E, 170, 171, 172; 260/308 B; 208/47; 210/58; 21/2.7 R

[56] References Cited
UNITED STATES PATENTS

| | | | |
|---|---|---|---|
| 2,742,369 | 4/1956 | Hatch | 252/389 A |
| 2,877,188 | 3/1959 | Liddell | 252/390 |
| 3,245,915 | 4/1966 | Rai et al. | 252/390 |
| 3,334,054 | 8/1967 | Howard et al. | 252/390 |
| 3,337,471 | 8/1967 | Levy et al. | 252/170 |

FOREIGN PATENTS OR APPLICATIONS

| | | | |
|---|---|---|---|
| 1,004,259 | 9/1965 | United Kingdom | 252/390 |

Primary Examiner—Benjamin R. Padgett
Assistant Examiner—Irwin Gluck
Attorney, Agent, or Firm—Owen & Owen

[57] ABSTRACT

Solutions of mixtures of benzotriazole and tolyltriazole in water and organic solvents such as benzene and tetrachloroethylene are disclosed. The aqueous solutions contain 40 to 98 percent by weight of benzotriazole and from 60 percent to 2 percent by weight of tolyltriazole, on a solid basis. The aqueous solutions may also contain sodium hydroxide, potassium hydroxide or another pH control agent, and may also contain isopropanol, ethylene glycol or another organic solubilizer that is soluble in water. Aqueous solutions according to the invention are useful as additives for cooling water because of the ability of both benzotriazole and tolyltriazole to inhibit metal corrosion. The benzene solutions contain 2 to 98 percent by weight of benzotriazole and from 98 percent to 2 percent by weight of tolyltriazole, on a solids basis. The tetrachloroethylene solutions contain 2 to 98 percent by weight of benzotriazole and from 98 to 2 percent by weight of tolyltriazole, on a solids basis. Benzene — benzotriazole/tolyltriazole solutions are useful in unleaded gasolines, and tetrachloroethylene — benzotriazole/tolyltriazole solutions are useful as dry-cleaning or metal-cleaning additives. Benzotriazole/tolyltriazole impregnated paper for use as a vapor phase corrosion inhibitor for copper and copper alloys may be produced without the use of a solvent system.

1 Claim, 7 Drawing Figures

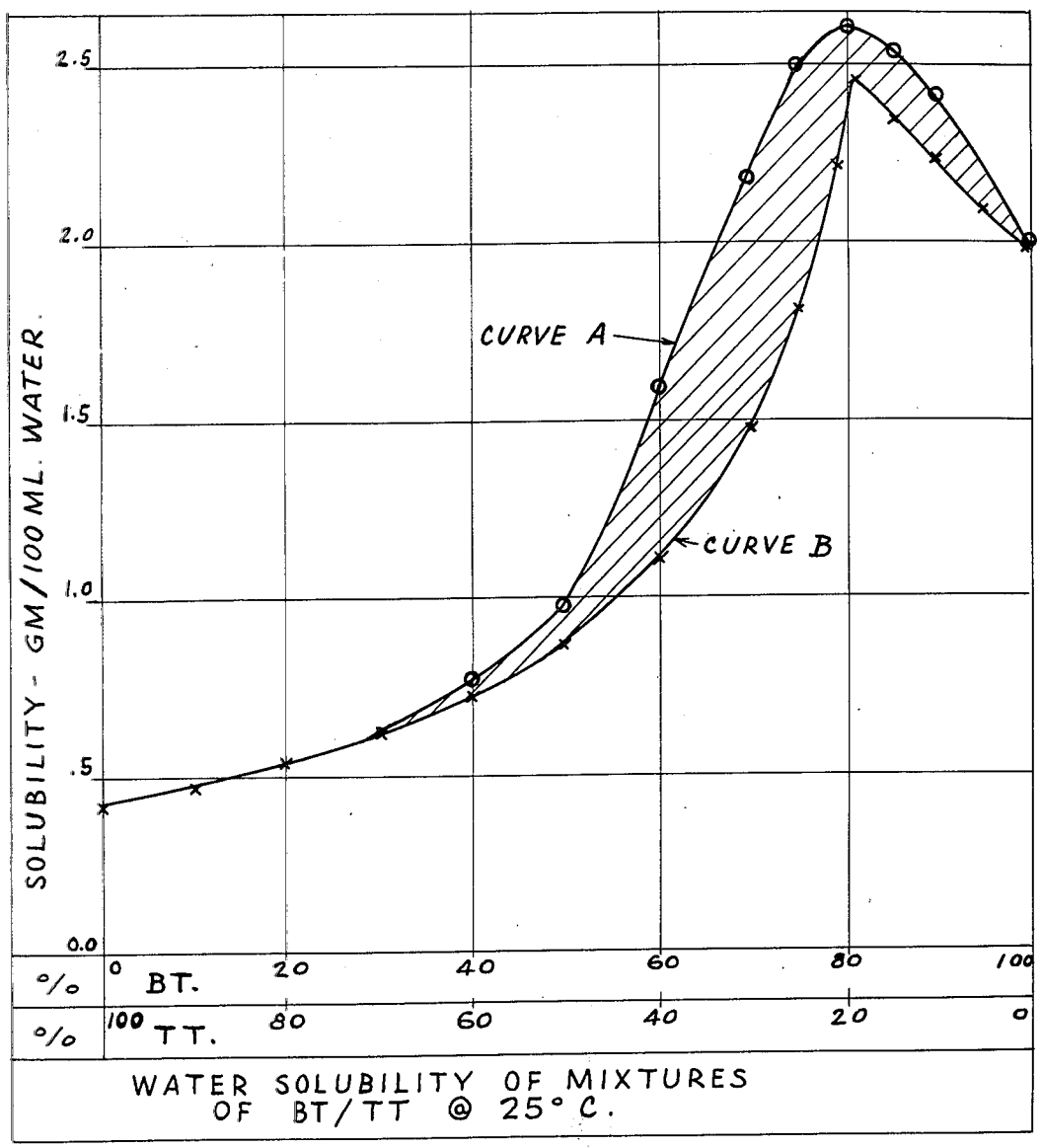
FIG-1-

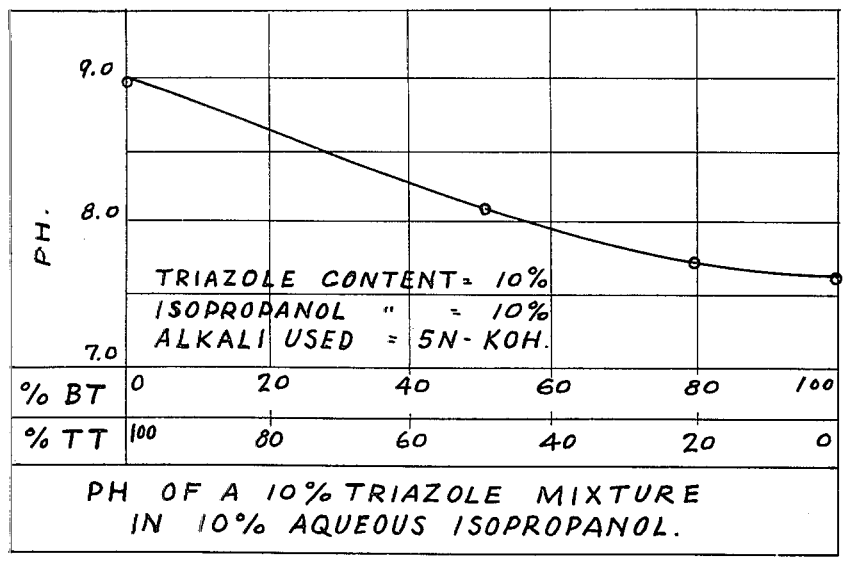
FIG-2-
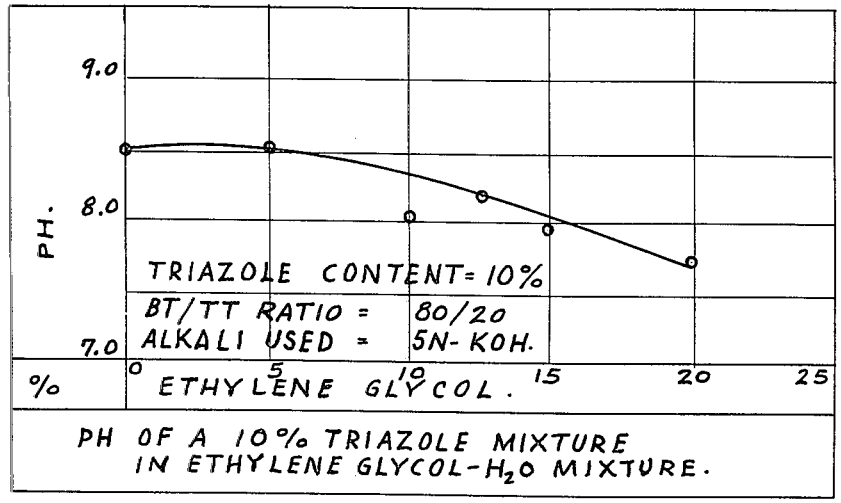
FIG-3-

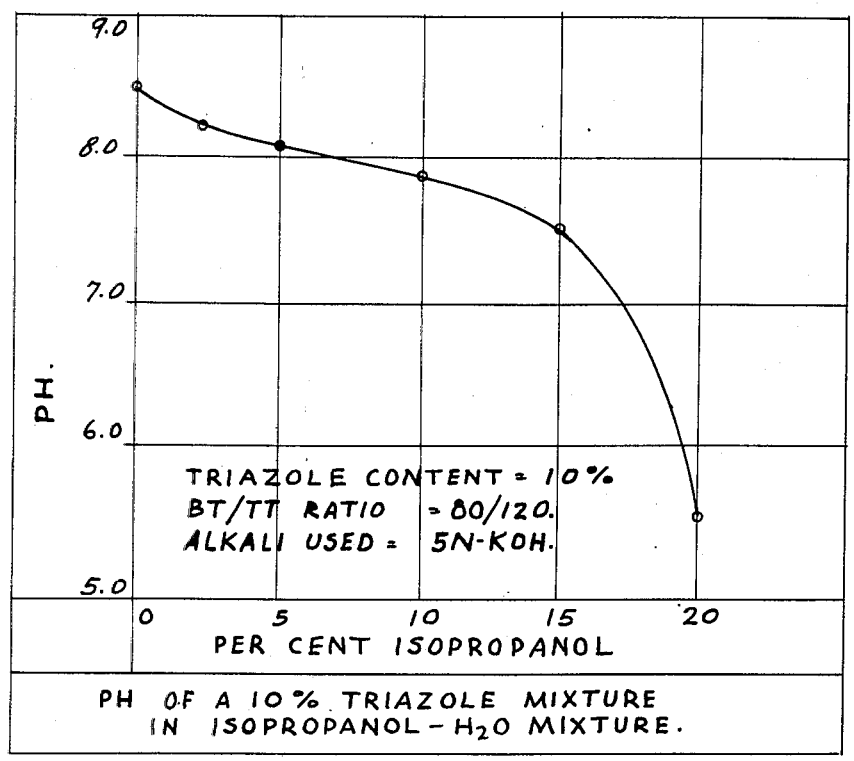
FIG-4-

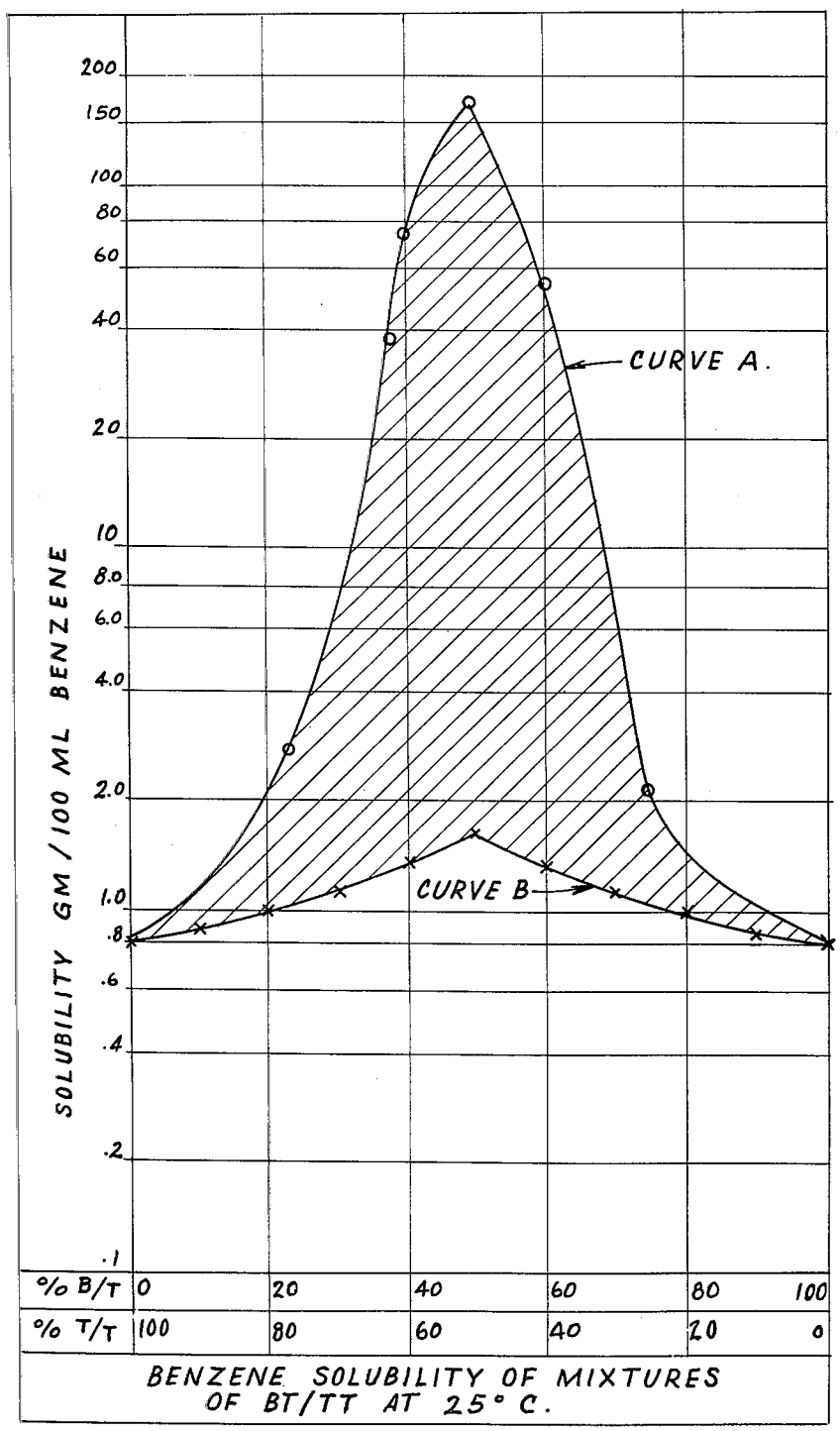
FIG-5-

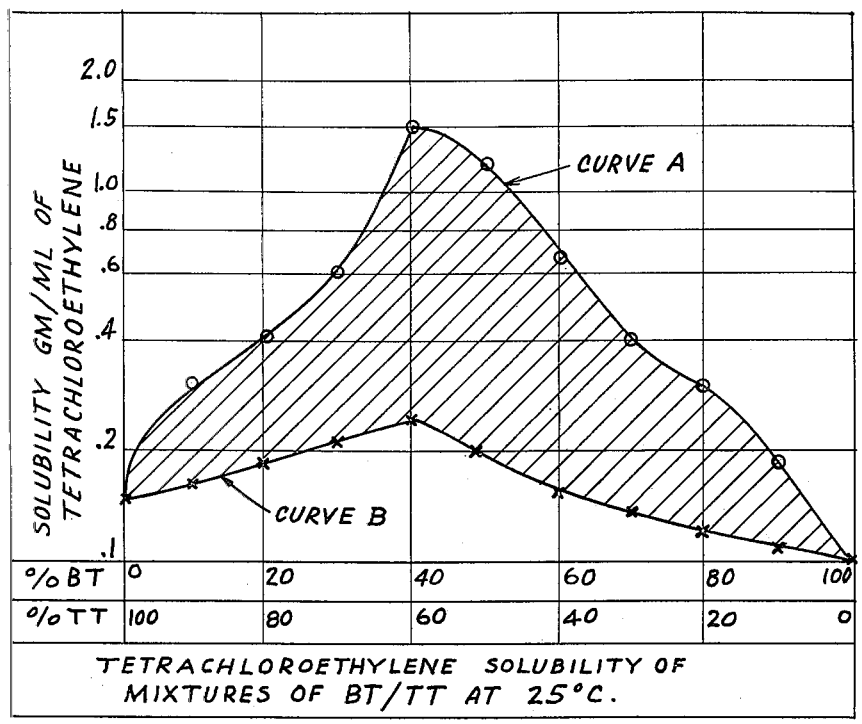
FIG-6-
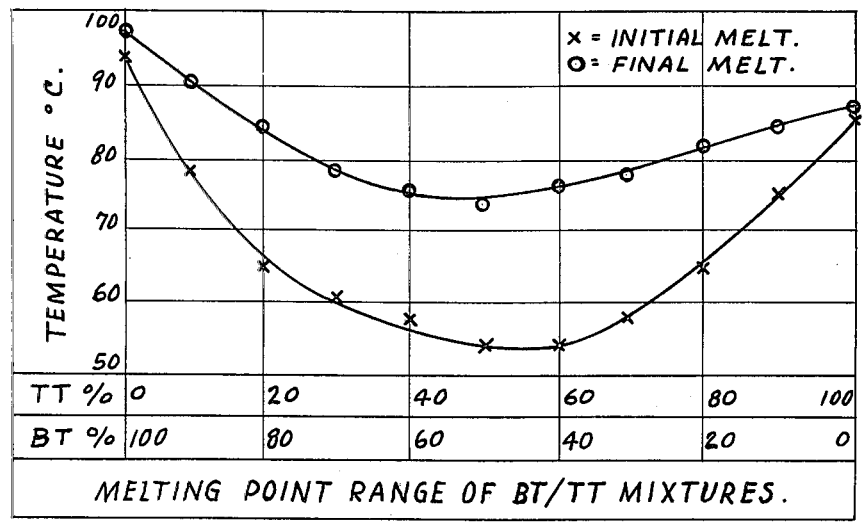
FIG-7-

BENZOTRIAZOLE AND TOLYLTRIAZOLE MIXTURE WITH TETRACHLOROETHYLENE

This is a continuation of Application Ser. No. 152,528, Filed June 14, 1971, now U.S. Pat. No. 3,803,049.

DEFINITIONS

The abbreviation BT is used herein to refer to benzotriazole

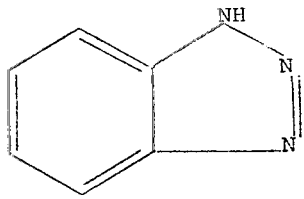

The abbreviation TT is used herein to identify tolyltriazole (isomer mixtures)

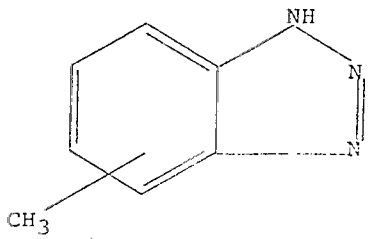

BACKGROUND OF THE INVENTION

Cooling water is used in many industrial, commercial and even private systems in connection with air conditioning and other temperature-control systems and to remove heat from various commercial processes, e.g. in connection with fractional distillations and various chemical processes. To the actual user of cooling water, the source may be his local water system, a nearby river, lake or stream, or a spring or well. Numerous difficulties may be encountered in using cooling water, depending upon what impurities are in the water from the particular source selected. For example, if the cooling water is vaporized, scale formation may be a problem, this problem can be avoided by "softening" the water, e.g., by ion exchange treatment or by precipitating the "scale formers", by adding a sequestering agent such as a lignosulfonate, an inorganic polyphosphonate, an organo phosphonate or a polysilicate of the type formed by a sodium silicate, or, as suggested in U.S. Pat. No. 3,492,240, by adding hydrolyzed polyacrylonitrile or, as suggested by French Patent 1,550,452, by adding polymethacrylic acid or an alkali salt thereof. It is frequently desirable to add a biocide to cooling water, e.g., to inhibit the growth of algae therein. Frequently, cooling water is circulated in a system made of at least one metal, so that inhibiting corrosion of the metal by the water is desirable. It has been suggested, South African Patent 68/03379, that a combination of an organophosphonic acid, a water soluble azole and a water soluble zinc salt can be used to prevent corrosion (see also, U.S. Pat. No. 2,941,953). Water soluble corrosion inhibitors added to the water form a monomolecular film at the metal-water interface. Compounds suggested are: inorganic polyphosphates, inorganic polyphosphates plus zinc, chromate-zinc and chromate-zinc-phosphate. Nonchromate compounds include amino-methylene-phosphonate (AMP) plus zinc, polyol-ester phosphate with or without zinc and polyacrylamide-silica polymers. See "Cooling Towers Boost Water Reuse" Environmental Science & Technology, Volume 5, No. 3 p. 205 (March 1971). Water from the available source may also contain silt, which can cause serious loss of heat exchange efficiency unless its deposition on heat exchanger surfaces is prevented. This can be accomplished by using certain lignosulfonate dispersants or, preferably, polyelectrolytes, in particular polyacrylics: see, for example "General Deposit Control Mechanisms", William H. Hales, Special Report presented at: International Water Conference, 13th Annual Meeting, William Penn Hotel Pittsburgh, Pennsylvania, October 28–30, 1969.

The treatment of the water in cooling water systems is a continuing problem, because chemicals added to the system may be lost as a consequence of chemical reactions that are involved in their performance of the desired function, because the chemical composition of the cooling water is changed as a consequence of its actual use, because make-up water must be added to the system from time to time, thereby diluting the entire system, because cooling water is periodically or continually removed from the system to prevent salt buildup, or for a combination of these and other reasons. Accordingly, it is necessary to monitor any given cooling water system periodically, and to make appropriate additions of treating chemicals. The frequency of the monitoring and addition varies drastically from system to system, and may be measured in months, weeks, days or hours: in extreme cases, continuous monitoring may be required.

It is highly desirable to add various treating chemicals to cooling water as aqueous solutions, because this enables volumetric metering as distinguished from gravimetric metering. It is much easier to add the required number of milliliters of a solution of known concentration than it is to add the corresponding number of milligrams of a solid treating chemical. Triazoles that can be used effectively to treat cooling water, e.g., BT and TT have comparatively low water solubilities of slightly less than 2 grams in 100 grams of water and slightly less than ½ gram in 100 grams of water, respectively. It would be desirable to use TT as the water-soluble triazole, because BT is the more expensive of the two. However, the higher water-solubility of BT makes it preferable, although even the higher water solubility of BT is sufficiently low to militate against its addition, in most instances, to cooling waters in the form of a water solution. Accordingly there is a need for a shippable solution, preferably containing TT, having a sufficiently high triazole concentration that it can be used to add triazole to cooling water systems.

Triazoles, including BT and TT, are also useful in the dry-cleaning and metal-cleaning industries. Dry-cleaning solvents such as chlorinated hydrocarbons and petroleum naphthas commonly use amine, phosphate or sulphonate-based detergents. These detergents have been found to cause corrosion of metal machine parts, especially copper. U.S. Pat. No. 3,337,471 suggests the use of BT and TT compounds added to the drycleaning solvent to prevent attack by the corrosive detergent-solvent-moisture combination.

A further use for triazoles is suggested by British Patents Nos. 907,794 and 954,564 which disclose that copper and copper-base alloys may be protected against discoloration by impregnating packaging materials with an aqueous or organic solution of a benzotriazole.

SUMMARY OF INVENTION

The instant invention is based upon the discovery that the solubility of certain blends of BT and TT in water and organic solvents is higher than would be expected on the basis of the water and organic solubilities of the two components of the blends. Specifically, aqueous blends of from 40 percent (The terms "percent" and "parts" are used herein, and in the appended claims, to refer to percent and parts by weight, unless otherwise indicated.) to 98 percent of BT with from 60 percent to 2 percent of TT have unexpectedly high solubility. Benzene blends of from 2 percent to 98 percent of BT with from 98 percent to 2 percent of TT have unexpectedly high solubility. Tetrachloroethylene blends of from 2 percent to 98 percent of BT with from 98 percent to 2 percent of TT have unexpectedly high solubility.

In another aspect, the invention is based upon the discovery that the solubility of BT, TT and blends of the two in water can be substantially enhanced by partially neutralizing the acid function of the triazole, for example with sodium hydroxide or potassium hydroxide. The invention is based upon the further discovery that the water solubility of BT, of TT, and of blends of the two can be still further enhanced by use of a limited amount of a water miscible organic solvent such as isopropanol or ethylene glycol in the solution.

In yet another aspect, the invention is based upon the discovery that a BT/TT mixture may be used to impregnate paper for use as a vapor phase corrosion inhibitor for copper and copper alloys without the use of a solvent system.

OBJECTS

It is, therefore, an object of the invention to provide relatively concentrated solutions of BT, of TT, or of mixtures of the two.

It is a further object of the invention to provide an aqueous solution of a blend of from 40 percent to 98 percent of BT with from 60 percent to 2 percent of TT, on a solids basis, and having an unexpectedly high triazole content.

It is another object of the invention to provide a solution of BT, TT, or a blend of BT and TT that is unexpectedly concentrated as a consequence of the partial neutralization of the acid function of the triazole.

It is a still further object of the invention to provide an aqueous solution of BT, TT or a mixture of the two in which the concentration of the triazole function is unexpectedly high as a consequence of the presence in the solution of a limited amount of a water-miscible organic solvent.

It is a still further object of the invention to provide a benzene mixture of a blend of from 2 percent to 98 percent BT with from 98 percent to 2 percent TT, on a solids basis, and having an unexpectedly high triazole content.

It is a still further object of this invention to provide a tetrachloroethylene mixture of a blend of 2 percent to 98 percent BT with from 98 to 2 percent of TT, on a solids basis, and having an unexpectedly high triazole content.

It is a still further object of the invention to provide a method for impregnating paper products with a BT/TT mixture for use as a vapor phase corrosion inhibitor for copper and copper alloys without the necessity of a solvent system.

Other objects and advantages will be apparent from the description which follows, reference being made to the accompanying drawings, in which:

DESCRIPTION OF DRAWINGS

FIG. 1 is a graph showing water solubility, in grams per 100 grams of water, of BT, TT and mixtures of BT and TT at 25°(All temperatures reported herein are in degree Centigrade, unless otherwise indicated.)

FIG. 2 is a graph showing the minimum pH at which a 10 percent solution of BT, of TT, or of mixtures of BT and TT containing 10 percent of the triazole or triazole composition can be achieved in water containing 10 percent of isopropanol.

FIG. 3 is a graph showing the minimum pH at which a 10 percent triazole content can be achieved, using a combination of 80 parts of BT and 20 parts of TT in water and in various combinations of water and ethylene glycol.

FIG. 4 is a graph similar to FIG. 3, but showing the minimum pH at which 10 percent triazole content can be achieved, using a mixture of 80 parts of BT and 20 parts of TT, in water and in various mixtures of water and isopropanol.

FIG. 5 is a graph showing benzene solubility in grams/100 ml. of benzene, of BT, TT and mixtures of BT and TT at 25°.

FIG. 6 is a graph showing tetrachloroethylene solubility in grams/100 ml. of tetrachloroethylene, of BT, TT and mixtures of BT and TT at 25°.

FIG. 7 is a graph showing the melting point range of BT/TT mixtures.

EXAMPLE 1

The solubilities of BT and TT in water at 25° were determined from solutions in equilibrium with a solid at 25°.

The solubilities of BT and TT mixtures were determined by adding incrementally differing amounts of each mixture to known amounts of water and rotating each such combination of BT, TT and water in a closed vessel immersed in a constant temperature bath maintained at 25°. Such rotation was continued for 16 hours, and the solution containing the highest concentration of completely dissolved solids was taken as the water solubility of each such mixture. The results of this investigation are presented in graphic form in FIG. 1 of the attached drawings. Two curves are shown in FIG. 1; Curve A shows experimentally determined solubilities of BT/TT mixtures, and Curve B shows theoretical maximum solubilities calculated from the solubility in water of BT and TT alone.

In an ideal solution there is complete uniformity of cohesive forces, i.e., if there are two components A and B, in solvent C, the forces between A and B, A and A, and B and B are all the same. In such a solution, the maximum amount of A and B capable of being dissolved in Solvent C will be equal to the sum of the solubility of each component alone in the given solvent. Because forces between components in a solvent are not equal, the actual solubility of a mixture is usually much less than the predicted solubility.

As indicated in FIG. 1, the curves of the experimentally determined solubility values and the theoretical maximum solubility values of BT/TT mixtures in water are similar. The experimentally determined solubility of the BT/TT mixtures is unexpectedly higher than the theoretical maximum solubility, on the basis of the water solubility of BT and TT alone, for mixtures containing from 40 percent to 98 percent BT, with from 60 percent to 2 percent, of TT. Such solutions are, therefore, unexpectedly useful as additives for cooling water treatment. The unexpected increase in the total amount of BT/TT mixture dissolved at a given BT/TT ratio is indicated by the shaded area between the two curves.

Preliminary experimental NMR isomer ratio data indicate that the isomeric mixture of tolytriazole contains approximately 40 percent 4-Methylbenzotriazole and 60 percent 5-Methylbenzotriazole. By changing the proportion of isomers present in the BT/TT mixture, the maximum solubility of the BT/TT mixture might be increased or decreased.

WATER SOLUBILITY OF MIXTURES OF BT/TT AT 25°C.

| TT/BT Ratio | Experimental Solubility | Theoretical Maximum Solubility |
|---|---|---|
| 100/0 | 0.450 g/100 ml. H$_2$O | 0.450 |
| 90/10 | 0.500 | 0.500 |
| 80/20 | | 0.560 |
| 70/30 | | 0.640 |
| 60/40 | 0.800 | 0.750 |
| 50/50 | 1.00 | 0.900 |
| 40/60 | 1.600 | 1.12 |
| 30/70 | 2.200 | 1.50 |
| 25/75 | 2.50 | 1.80 |
| 20/80 | 2.60 | 2.25 |
| 18.5/81.5 | | 2.45 |
| 15/85 | 2.50 | 2.35 |
| 10/90 | 2.400 | 2.22 |
| 5/95 | 2.100 | |
| 0/100 | 2.00 | 2.00 |

The calculations for theoretical maximum solubilities of varying BT/TT ratios were based on the experimentally determined solubility of BT and TT, alone, in the solvent used. As listed in the table above, and shown in FIG. 1, the solubility of TT in water is 0.450 g/100 ml. H$_2$O, and the solubility of BT is 2.00 g/100 ml. H$_2$O. The maximum theoretical solubility of a BT/TT mixture is the sum of the BT and TT solubilities, alone; 2.450 g/100 ml. H$_2$O. To calculate the maximum theoretical solubility of, for example, a 60/40 TT/BT mixture, 60 percent of X = 0.450 g. TT/100 ml. H$_2$O where X = Total BT/TT mixture theoretically capable of being dissolved. Therefore, for a 60/40 TT/BT mixture, X = 0.750 g. TT/BT. Similar calculations may be used to determine the theoretical maximum solubility of other BT/TT mixtures, in other solvents.

EXAMPLE 2

A 10 gram portion of a mixture of 80 parts of BT with 20 parts of TT was suspended in 90 grams water and a 5 normal NaOH solution in water was added dropwise, with stirring until all solids were in solution. It was determined that the amount of sodium hydroxide required to cause solution was approximately 30 percent of that theoretically required to neutralize the acid function of the triazole composition; the pH of the solution was 8.3.

EXAMPLE 3

Several procedures similar to that described above in Example 2 were carried out, except that BT, TT and mixtures of BT and TT, 10 grams each, were added to 90 grams of water containing 10 percent of isopropanol, and 5 normal KOH was added dropwise to each such composition until all of the solids dissolved. The results of these procedures are presented graphically in FIG. 2 of the attached drawings, which shows that (a) for 100 percent BT, sufficient 5 normal potassium hydroxide was required for dissolution to raise the pH to about 7.7; (b) for an 80/20 blend of BT and TT, sufficient potassium hydroxide to raise the pH to about 7.75 was required; (c) for a 50/50 blend of BT and TT, sufficient potassium hydroxide to raise the pH to about 8.1 was required; and (d) for TT, sufficient potassium hydroxide to raise the pH to about 8.8 was required.

EXAMPLE 4

Several procedures similar to those described in Example 3 were conducted, except that 10 gram portions of an 80/20 mixture of BT and TT were dissolved in 90 grams of water, or of water containing various amounts of added ethylene glycol. Five normal potassium hydroxide was then added dropwise to each composition until all solids dissolved. FIG. 3 shows the pH at which all solids were dissolved as a function of the percent of ethylene glycol added to the water.

EXAMPLE 5

Several procedures similar to those described in Example 4 were carried out, except that 10 gram portions of an 80/20, BT/TT composition were dissolved in 90 grams of water or in 90 grams of water to which varying amounts of isopropanol has been added. FIG. 4 shows the pH at which complete solution was achieved as a function of the percent of isopropanol in the water.

EXAMPLE 6

The solubilities of BT, TT and mixtures in benzene at 25° were determined at 25°. A modified experimental procedure similar to that described in Example 1 was used, except benzene was substituted for water as the solvent. Because of the differing solubilities of BT and TT, a number of solutions containing incrementally differing amounts of a given mixture were rotated for at least 16 hours in a constant temperature bath. The results are presented for clarity on a semi-logarithmic scale as shown in FIG. 5. Two curves are shown; Curve A shows experimentally determined solubilities of BT/TT mixtures, and Curve B shows theoretical maximum solubilities calculated from the solubility in benzene of BT and TT alone. The theoretical maximum solubility for an ideal solution would be 1.6 g./100 ml. benzene for a 50/50 BT/TT mixture. The experimentally determined maximum solubility shows a greater than 100-fold increase over the theoretical maximum solubility.

FIG. 5 shows that the benzene solubility is unexpectedly high, on the basis of benzene solubility of BT and TT alone, for mixtures containing from 2 percent to 98 percent or even more BT, with from 98 percent to 2 percent, or even less, of TT. The unexpected increase in the total amount of BT/TT mixture dissolved at a given BT/TT ratio is indicated by the shaded area between the two curves. Unleaded gasolines typically may contain from 40–60 percent benzene, toluene, or xylene as aromatic compounds. The unexpectedly high solubility of BT/TT mixtures in benzene makes such mixtures useful for use in unleaded gasoline to prevent corrosion of the fuel system.

BENZENE SOLUBILITY OF MIXTURES OF BT/TT AT 25°C.

| TT/BT Ratio | Experimental Solubility | Theoretical Maximum Solubility |
|---|---|---|
| 0/100 | 0.81 ± 0.02 g/100 ml. benzene | 0.81 |
| 10/90 | | 0.90 |
| 20/80 | | 1.02 |
| 25/75 | 2.2 ± 0.02 | 1.08 |
| 30/70 | | 1.15 |
| 40/60 | 55.5 ± 0.5 | 1.35 |
| 50/50 | 165 ± 5 | 1.62 |
| 60/40 | 74.5 ± 0.5 | 1.35 |
| 70/30 | | 1.15 |
| 75/25 | 2.8 ± 0.02 | |
| 80/20 | | 1.01 |
| 90/10 | | 0.90 |
| 100/0 | 0.81 ± 0.02 | 0.81 |

EXAMPLE 7

The solubilities of BT, TT and mixtures in tetrachloroethylene at 25° were determined at 25°. The experimental procedure used was that described in Example 6, except tetrachloroethylene was substituted for benzene as the solvent. Because of the differing solubilities of BT and TT, a number of solutions containing incrementally differing amounts of a given mixture were rotated for at least 16 hours in a constant temperature bath. The results are presented for clarity on a semilogarithmic scale as shown in FIG. 6. Two curves are shown; Curve A shows experimentally determined solubilities of BT/TT mixtures, and Curve B shows theoretical maximum solubilities calculated from the solubility in tetrachloroethylene of BT and TT alone. The theoretical maximum solubility for an ideal solution would be 0.25 g./100 ml. tetrachloroethylene for a 50/50 BT/TT mixture. The experimentally determined maximum solubility shows a greater than six-fold increase over the theoretical maximum solubility. The unexpected increase in the total amount of BT/TT mixture dissolved at a given BT/TT ratio is indicated by the shaded area between the two curves. The tetrachloroethylene solubility is unexpectedly high, on the basis of tetrachloroethylene solubility of BT and TT alone, for mixtures containing from 2 percent to 98 percent or even more BT, with from 98 percent to 2 percent, or even less, of TT. Such solutions are, therefore, unexpectedly useful as additives in the dry-cleaning or metal-cleaning industry.

TETRACHLOROETHYLENE SOLUBILITY OF MIXTURES OF BT/TT AT 25°C.

| TT/BT Ratio | Experimental Solubility | Theoretical Maximum Solubility |
|---|---|---|
| 0/100 | 0.10 g/100 ml. tetrachloroethylene | 0.10 |
| 10/90 | 0.18 | 0.11 |
| 20/80 | 0.30 | 0.124 |
| 30/70 | 0.40 | 0.143 |
| 40/60 | 0.68 | 0.166 |
| 50/50 | 1.35 | 0.200 |
| 60/40 | 1.58 | 0.250 |
| 70/30 | 0.60 | 0.214 |
| 80/20 | 0.40 | 0.187 |
| 90/10 | 0.30 | 0.165 |
| 100/0 | 0.15 | 0.150 |

EXAMPLE 8

The melting point profile of a series of BT/TT mixtures was experimentally determined by standard procedures. As shown graphically in FIG. 7, a series of BT/TT mixtures, in 10 percent increments, was used to determine the eutectic point. The experimental results show that while a 100/0 mixture of BT/TT has a melting point of about 98°, a 50/50 BT/TT mixture has a melting point of 73°. Because of the low melting point of the BT/TT mixture, paper can be impregnated therewith by spraying or brushing the molten mixture onto the paper, thus eliminating the need for the use of a solvent system to accomplish such impregnation. This is important, because the cost of solvent recovery or, in the absence of solvent recovery, the cost of the solvent is eliminated. It is also known that incomplete solvent recovery contributes to environmental pollution. Paper impregnated with BT and TT is useful because it acts as a vapor phase corrosion inhibitor for copper and copper alloys wrapped therein. Although the BT/TT mixture does not recrystallize readily, paper impregnated therewith was not tacky; the BT/TT mixture did not stain the metal samples tested.

The unexpected increase in maximum solubility of BT/TT mixtures in such diverse solvents as benzene and tetrachloroethylene, as demonstrated in Examples 6 and 7, indicates that increased solubility in such aromatic solvents as toluene, xylene, ethylmethylbenzene, propyl or butyl-benzene, and aliphatic solvents such as methylene chloride and mixtures, may be expected.

What I claim is:

1. A solution of a triazole in tetrachloroethylene, consisting of a mixture of from 2 to 98 percent of benzotriazole and from 98 to 2 percent of tolyltriazole, where the total amount of triazole dissolved is a function of the proportion of benzotriazole and tolyltriazole present in the solution, and is represented by the shaded area between curve A and B of FIG. 6 of the attached drawing.

* * * * *